(12) United States Patent
Nedungadi et al.

(10) Patent No.: US 12,095,758 B2
(45) Date of Patent: Sep. 17, 2024

(54) METHODS AND SYSTEMS FOR NETWORK DEVICE AUTHENTICATION

(71) Applicant: Nile Global, Inc., San Jose, CA (US)

(72) Inventors: Promode Nedungadi, San Jose, CA (US); Steve Alexander, Woodside, CA (US); Avinash Kumar, San Ramon, CA (US)

(73) Assignee: Nile Global, Inc., San Jose, CA (US)

( * ) Notice: Subject to any disclaimer, the term of this patent is extended or adjusted under 35 U.S.C. 154(b) by 332 days.

(21) Appl. No.: 17/579,467

(22) Filed: Jan. 19, 2022

(65) Prior Publication Data

US 2023/0231842 A1 Jul. 20, 2023

(51) Int. Cl.
*G06F 9/54* (2006.01)
*H04L 9/40* (2022.01)
*H04L 67/56* (2022.01)

(52) U.S. Cl.
CPC .......... *H04L 63/0823* (2013.01); *G06F 9/547* (2013.01); *H04L 63/166* (2013.01); *H04L 67/56* (2022.05)

(58) Field of Classification Search
CPC ... H04L 63/0823; H04L 63/166; H04L 67/56; H04L 63/0281; H04L 63/0869; H04L 63/0884; G06F 9/547
See application file for complete search history.

(56) References Cited

U.S. PATENT DOCUMENTS

| | | | |
|---|---|---|---|
| 10,581,847 B1* | 3/2020 | Sun | H04L 63/083 |
| 11,159,416 B1* | 10/2021 | Colwell | H04L 43/50 |
| 2006/0195895 A1 | 8/2006 | Ben-Shachar et al. | |
| 2009/0077206 A1 | 3/2009 | Dunn et al. | |
| 2016/0218881 A1* | 7/2016 | Adams | H04L 9/3239 |
| 2016/0285681 A1 | 9/2016 | Kreet et al. | |
| 2019/0280883 A1 | 9/2019 | Fenner et al. | |
| 2019/0335333 A1 | 10/2019 | Sohail et al. | |
| 2021/0297259 A1 | 9/2021 | Rahn et al. | |
| 2021/0399920 A1* | 12/2021 | Sundararajan | H04L 41/12 |

OTHER PUBLICATIONS

PCT/US2023/011068, International Search Report and Written Opinion, May 17, 2023, 11 pgs.

* cited by examiner

*Primary Examiner* — Amie C. Lin
(74) *Attorney, Agent, or Firm* — LOZA & LOZA, LLP

(57) ABSTRACT

Embodiments of a device and method are disclosed. In an embodiment, a method for network device authentication involves using Remote Procedure Call (RPC) proxies of network devices of a network at a customer site, accessing identity certificates from Trusted Platform Modules (TPMs) of the network devices, and using the RPC proxies, sequentially establishing Transport Layer Security (TLS) connections between the network devices to perform mutual authentication between the network devices based on the identity certificates.

20 Claims, 11 Drawing Sheets

METHODS AND SYSTEMS FOR NETWORK DEVICE AUTHENTICATION

BACKGROUND

Various network elements or systems, such as switches and routers in an interconnected topology, for example, comprising of one or more distribution switches (DSs), headends (HEs), access switches (ASs), access point (APs), and/or sensors, are typically deployed in a customer site to provide connectivity as a service. For different network devices to work with each other, network device authentication plays an important role in ensuring that network security meets customer requirements. For example, network device authentication is important to build a mutual trust between different network devices. Therefore, there is a need for network device authentication technology that can provide effective network device authentication among various network devices.

SUMMARY

Embodiments of a device and method are disclosed. In an embodiment, a method for network device authentication involves using Remote Procedure Call (RPC) proxies of network devices of a network at a customer site, accessing identity certificates from Trusted Platform Modules (TPMs) of the network devices, and using the RPC proxies, sequentially establishing Transport Layer Security (TLS) connections between the network devices to perform mutual authentication between the network devices based on the identity certificates. Other embodiments are also described.

In an embodiment, the TLS connections include RPC connections.

In an embodiment, using the RPC proxies, sequentially establishing the TLS connections between the network devices includes validating the identity certificates among the network devices.

In an embodiment, the network includes a first network device, a second network device, and a third network device, and using the RPC proxies, sequentially establishing the TLS connections between the network devices includes establishing a first TLS connection between the first network device and the second network device, and after the first TLS connection is established, establishing a second TLS connection between the second network device and the third network device.

In an embodiment, the network further includes a fourth network device, and using the RPC proxies, sequentially establishing the TLS connections between the network devices further includes after the second TLS connection is established, establishing a third TLS connection between the third network device and the fourth network device.

In an embodiment, the network further includes a fifth network device, and using the RPC proxies, sequentially establishing the TLS connections between the network devices further includes after the first TLS connection is established, establishing a third TLS connection between the first network device and the fifth network device.

In an embodiment, the method further includes storing the identity certificates in a plurality of secure storage units of the TPMs.

In an embodiment, a method for network device authentication involves using a first RPC proxy of a first network device, accessing a first identity certificate from a first TPM of the first network device, and using the first RPC proxy, attempting to establish a TLS connection with a second RPC proxy of a second network device based on the first identity certificate and a second identity certificate of the second network device.

In an embodiment, the method further includes using the second RPC proxy of the second network device, accessing the second identity certificate from a second TPM of the second network device.

In an embodiment, the TLS connection includes an RPC connection.

In an embodiment, using the first RPC proxy, attempting to establish the TLS connection with the second RPC proxy of the second network device based on the first identity certificate and the second identity certificate of the second network device includes validating the first and second identity certificates by the first and second network devices.

In an embodiment, when the first and second identity certificates are successfully validated by the first and second network devices, the TLS connection is established between the first RPC proxy and the second RPC proxy.

In an embodiment, the method further includes when the first and second identity certificates are not successfully validated by the first and second network devices, prohibiting the first and second network devices from communicating with each other.

In an embodiment, the method further includes when the first and second identity certificates are not successfully validated by the first and second network devices, generating an alert notification to a cloud server.

In an embodiment, the method further includes storing the first identity certificate in a first secure storage unit of the first TPM, and storing the second identity certificate in a second secure storage unit of the second TPM.

In an embodiment, a method for network device authentication involves using RPC proxies of network devices of a network at a customer site, accessing identity certificates from TPMs of the network devices, and using the RPC proxies, establishing TLS connections between the network devices to perform mutual authentication between the network devices based on the identity certificates in a particular sequence based on a network topology of the network, where the TLS connections includes RPC connections.

In an embodiment, using the RPC proxies, sequentially establishing the TLS connections between the network devices includes validating the identity certificates among the network devices.

In an embodiment, the network includes network devices of a first type, network devices of a second type, and network devices of a third type, and using the RPC proxies, establishing the TLS connections between the network devices includes establishing a first set of TLS connections between the network devices of the first type and the network devices of the second type, and after the first set of TLS connections are established, establishing a second set of TLS connections between the network devices of the second type and the network devices of the third type.

In an embodiment, the network further includes network devices of a fourth type, and using the RPC proxies, establishing the TLS connections between the network devices further includes after the second set of TLS connections are established, establishing a third set of TLS connections between the network devices of the third type and the network devices of the fourth type.

In an embodiment, the network further includes network devices of a fifth type, and using the RPC proxies, establishing the TLS connections between the network devices further includes after the first set of TLS connections are established, establishing a third set of TLS connections between the network devices of the first type and the network devices of the fifth type.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
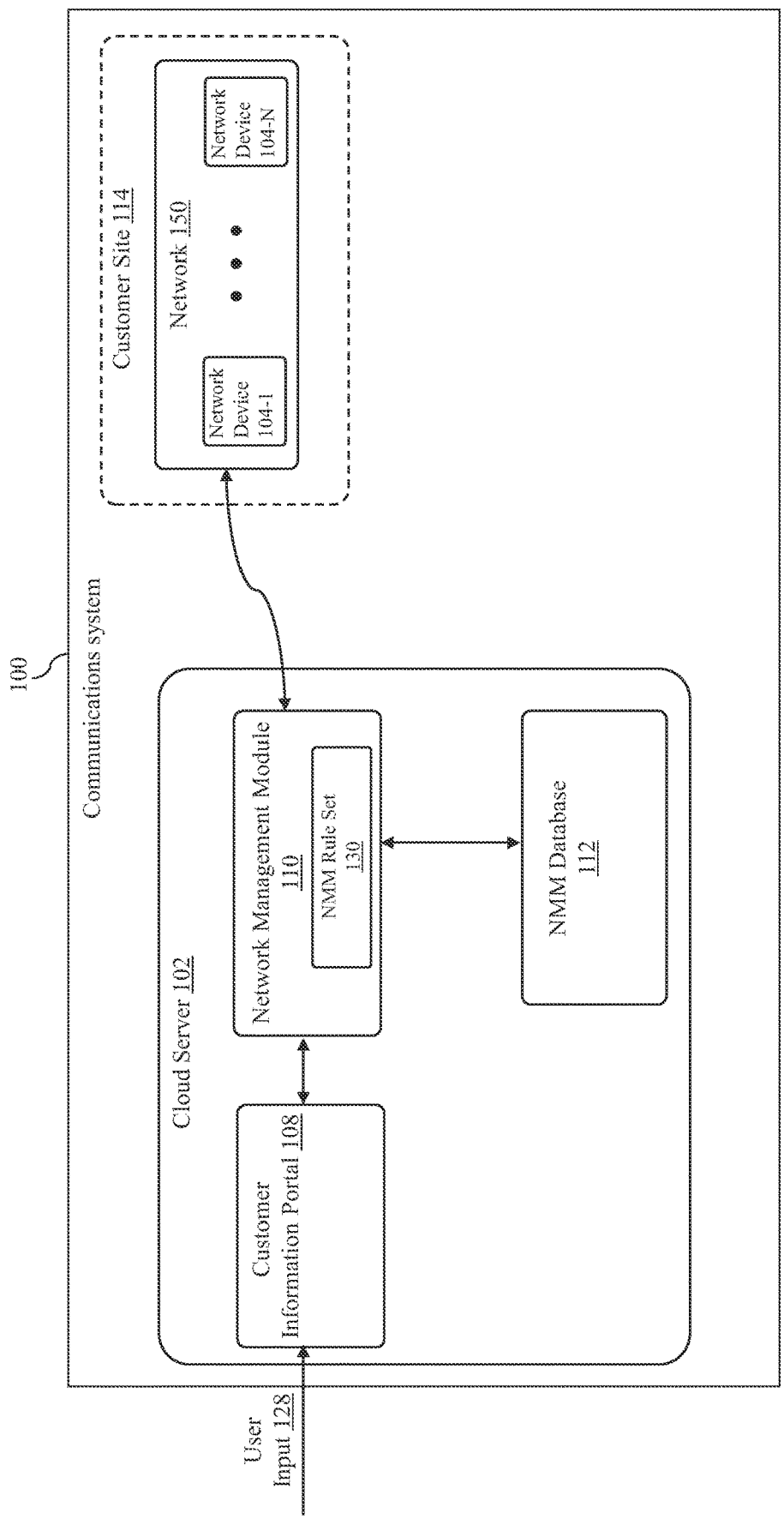
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., an authentication service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., an authentication service) to network devices (e.g., the deployed network 150) at the customer site 114, for example, using an NMM rule set 130. The NMM rule set 130 may include one or more NMM rules (e.g., authentication rules) for network devices at the customer site 114, for example, for performing an NMM service (e.g., an authentication service) to network devices at the customer site 114. In some embodiments, the NMM module 110 is configured to generate and/or transmit at least one alert (e.g., a device outage alert or a network throughput alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network diagnostic for network devices at the customer site, network diagnostic efficiency can be improved. In addition, because the NMM deployment module can facilitate or perform a network management service or operation for network devices at the customer site, an administrator or a customer can be notified of device and/or network conditions or outages. Consequently, device and/or network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. The network 150 may include network devices, such as, switches and routers in an interconnected topology, for example, comprising of at least one of a distribution switch (DS) or distribution layer switch, an access switch (AS), and/or a wireless AP. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
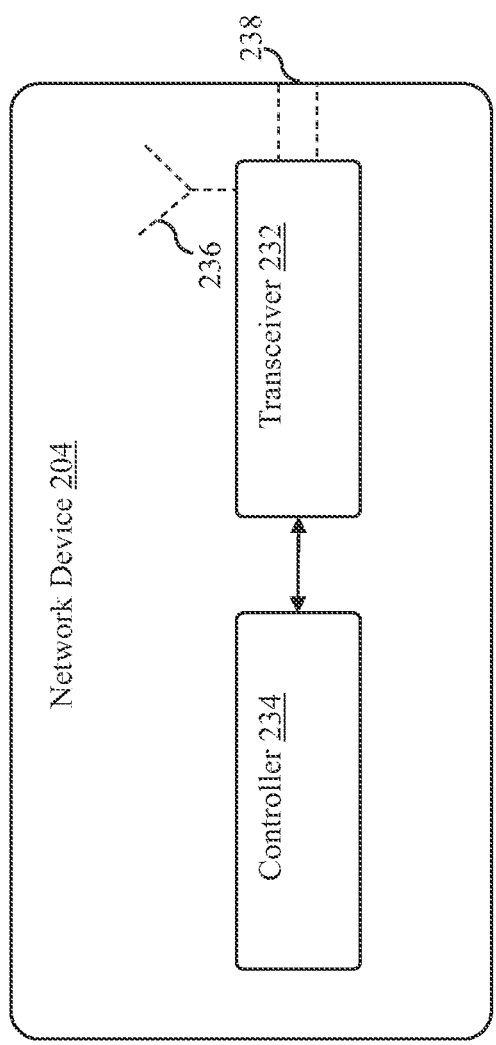
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor. In the embodiment depicted in FIG. 2, a network device 204 includes at least one wireless and/or wired transceiver 232, at least one antenna 236 operably connected to the transceiver 232-1, at least one optional network port 238 operably connected to the transceiver 232, and a controller 234 operably connected to the transceiver 232. In some embodiments, the transceiver 232 includes a physical layer (PHY) device. The transceivers 232 may be any suitable type of transceiver. For example, the transceiver 232 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth or BLE transceiver) and a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports.

Figure 3:
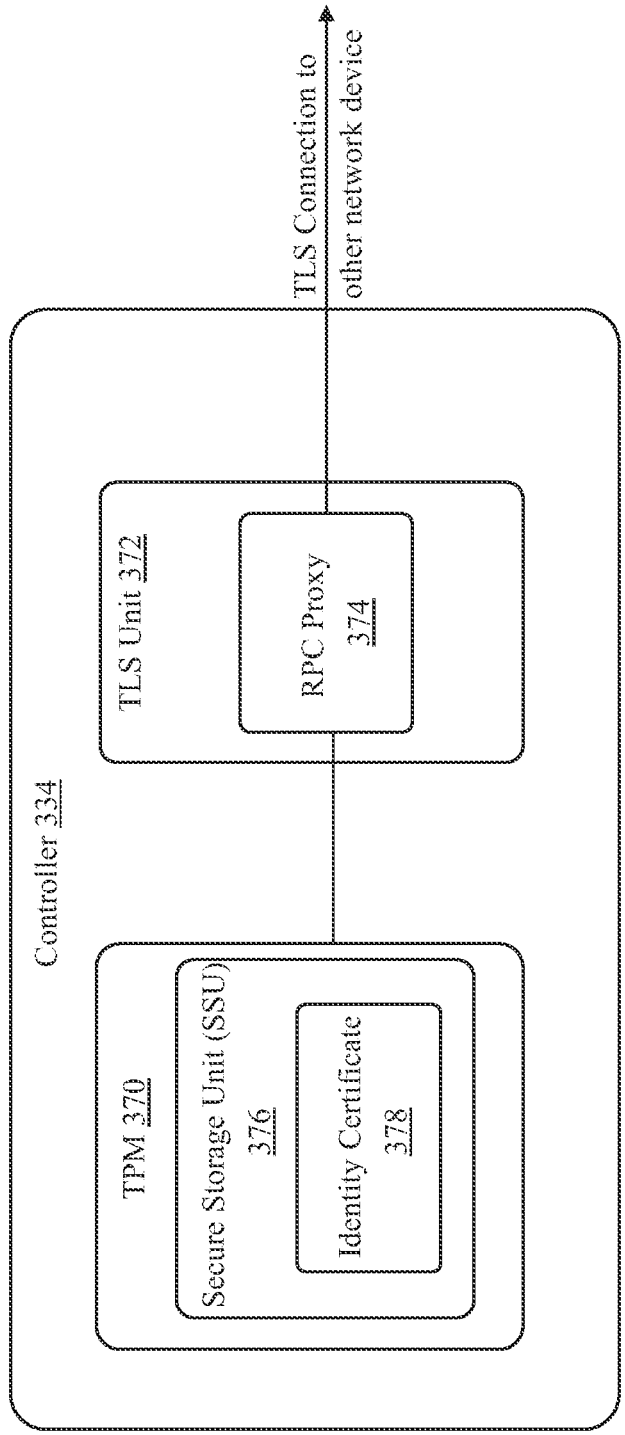
FIG. 3 depicts an embodiment of a controller of the network device depicted in FIG. 2.

FIG. 3 depicts a controller 334, which is an embodiment of the controller 234 of the network device 204 depicted in FIG. 2. The controller 334 depicted in FIG. 3 is one possible embodiment of the controller 234 depicted in FIG. 2. However, the controller 234 depicted in FIG. 2 is not limited to the embodiment shown in FIG. 3. In the embodiment depicted in FIG. 3, the controller 334 includes a Trusted Platform Module (TPM) 370 and a Transport Layer Security (TLS) unit 372 operably connected to the TPM 370.

In the embodiment depicted in FIG. 3, the TPM 370 includes a secure storage unit (SSU) 376 that is configured to store an identify certificate 378, which can be any type of encryption information and/or encryption keys. For example, the identify certificate 378 may be a Rivest-Shamir-Adleman (RSA) private key or another encryption private key. Because the identify certificate 378 is stored in the secure storage unit 376 of the TPM 370, external attacks become more difficult or even infeasible. In some embodiments, the TPM 370 is a tamper proof hardware (e.g., a tamper proof IC chip) that performs operations using the identify certificate 378 without revealing the identify certificate 378 to outside entities. In some embodiments, the TPM 370 includes a secure crypto processor configured to carry out cryptographic operations (e.g., generating, storing, and/or limiting the use of cryptographic keys) and/or multiple physical security mechanisms to make the TPM 370 tamper-resistant. Consequently, it is difficult or impossible for malicious software to tamper with the security functions of the TPM 370. In some embodiments, the TPM is replaced by a hardware security module (HSM). In some embodiments, the identify certificate 378 stored in the TPM 370 of a network device is unique to the network device and is, for example, tied to the serial number and other unique identity of the network device, such as the Ethernet MAC address of the network device. Impersonating a network device typically requires an attacker to gain access the identify certificate 378. By storing the identify certificate 378 in the TPM 370, impersonation attacks become more difficult or even infeasible. In some embodiments, the controller 334 includes a cryptographic engine configured to generate a client signature based on the identify certificate 378.

In the embodiment depicted in FIG. 3, the TLS unit 372 includes a remote procedure call (RPC) proxy 374 configured to interact with the TPM 370 to perform TLS operations that require the identify certificate 378. In some embodiments, the RPC proxy 374 is configured to, based on the identify certificate 378 stored in the TPM 370, establish a TLS connection to a corresponding network device, for example, a peer network device in a network (e.g., the network 150 deployed at the customer site 114). Based on the established TLS connection with a corresponding network device, the controller 334 of a network device may perform mutual authentication with the corresponding network device, for example, a peer network device in a network (e.g., the network 150 deployed at the customer site 114). For example, the network devices 104-1, 104-2 in the network 150 use their RPC proxies to establish a TLS connection between the network devices 104-1, 104-2 to perform mutual authentication.

Figure 4:
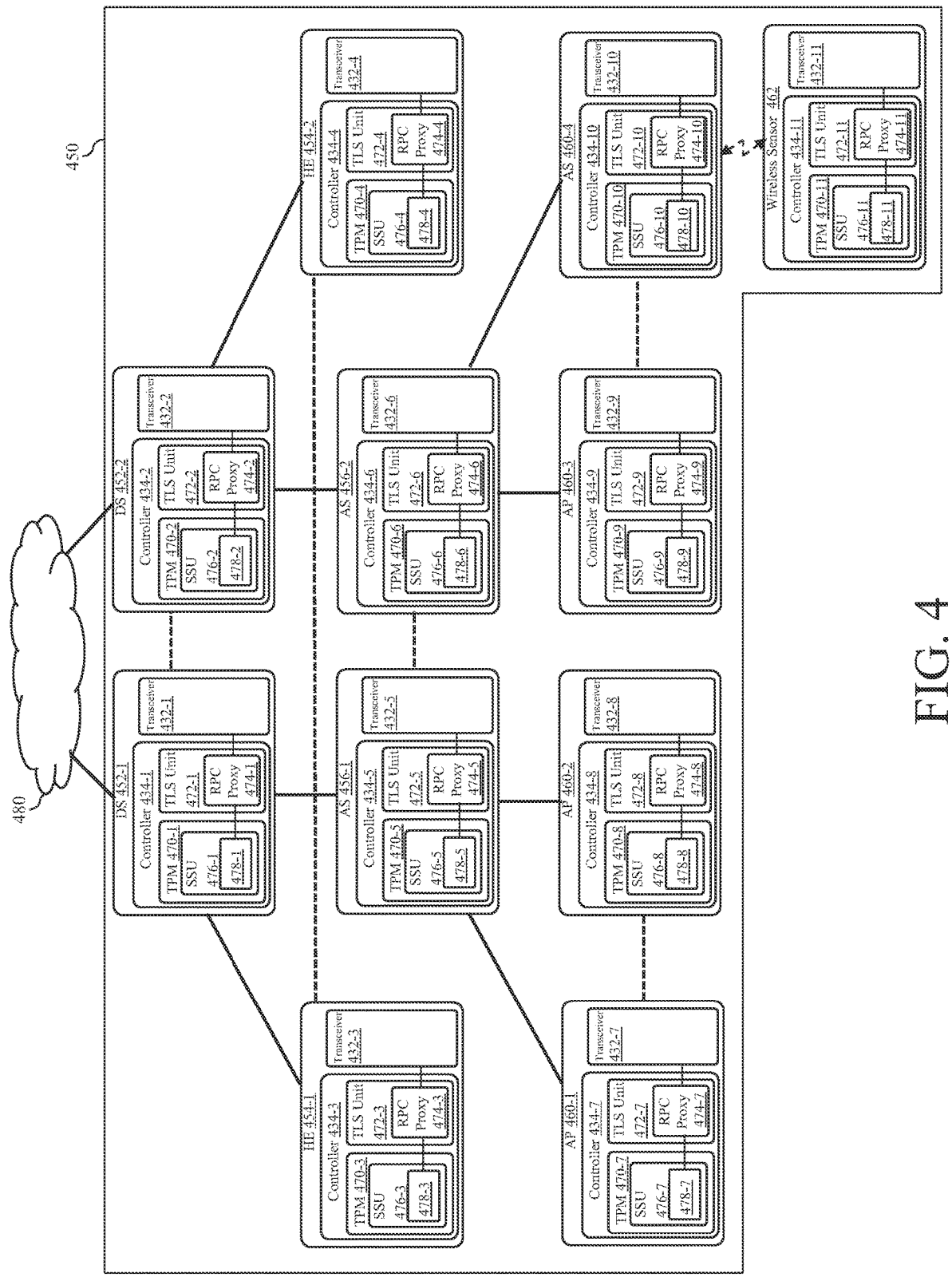
FIG. 4 depicts a network that can be included in the communications system depicted in FIG. 1.

FIG. 4 depicts a network 450 that can be included in the communications system 100 depicted in FIG. 1. The network 450 depicted in FIG. 4 is an embodiment of the network 150 depicted in FIG. 1. However, the network 150 depicted in FIG. 1 is not limited to the embodiment depicted in FIG. 4. In the embodiment depicted in FIG. 4, the network 450 includes a pair of distribution switches (DSs) or distribution layer switches 452-1, 452-2 that are aggregation switches functioning as a bridge between core layer switches and access layer switches, a pair of head ends (HEs) or gateways 454-1, 454-2, a number of access switches (ASs) 456-1, 456-2 that can directly interact with lower level devices (e.g., wireless APs), a number of wireless APs 460-1, 460-2, 460-3, 460-4 connected to the ASs, and a wireless sensor 462 that wirelessly connect to the wireless AP 460-4. The DSs 452-1, 452-2 are connected to a network 480 (e.g., the Internet), which is connected to a network management module (e.g., the network management module 110 of the cloud server 102 depicted in FIG. 1). Although the network 450 is shown with certain components and described with certain functionality herein, other embodiments of the network 450 may include fewer or more components to implement the same, less, or more functionality. For example, in some embodiments, the network 450 includes no DS, only one DS, more than two DSs, no HE, only one HE, more than two HEs, no AS, one AS, more than two ASs, less than four wireless APs, more than four wireless APs, no wireless sensor, and/or more than one wireless sensor. In another example, the network 450 includes only at least one AS and at least one wireless AP with no DS and no HE. In another example, although the network 450 is shown in FIG. 4 as being connected in certain topology, the network topology of the network 450 is not limited to the topology shown in FIG. 4. In some embodiments, the network 450 constitutes a network service block (NSB), which is a basic building block for providing connectivity as a service and is a replicable block that can be scaled (e.g., expanded) to meet any deployment. In some embodiments, the number of HEs and DSs is constant in the network 450 while the number of the wireless APs, the ASs and the sensor(s) in the network 450 varies.

In the embodiment depicted in FIG. 4, the DS 452-1 includes a transceiver 432-1 and a controller 434-1 operably connected to the transceiver 432-1, which includes a TPM 470-1 and a TLS unit 472-1 operably connected to the TPM 470-1. In the embodiment depicted in FIG. 4, the TPM 470-1 includes a secure storage unit (SSU) 476-1 that is configured to store an identify certificate 478-1. The TLS unit 472-1 includes an RPC proxy 474-1 configured to interact with the TPM 470-1 to, based on the identify certificate 478-1 stored in the TPM 470-1, establish a TLS connection to another network device. Although the DS 452-1 is shown in FIG. 4 as not including an antenna and/or network port, in some embodiments, the DS 452-1 includes at least one antenna operably connected to the transceiver 432-1 and/or at least one optional network port operably connected to the transceiver 432-1.

In the embodiment depicted in FIG. 4, the DS 452-2 includes a transceiver 432-2 and a controller 434-2 operably connected to the transceiver 432-2, which includes a TPM 470-2 and a TLS unit 472-2 operably connected to the TPM 470-2. In the embodiment depicted in FIG. 4, the TPM 470-2 includes a secure storage unit (SSU) 476-2 that is configured to store an identify certificate 478-2. The TLS unit 472-2 includes an RPC proxy 474-2 configured to interact with the TPM 470-2 to, based on the identify certificate 478-2 stored in the TPM 470-2, establish a TLS connection to another network device. Although the DS 452-2 is shown in FIG. 4 as not including an antenna and/or network port, in some embodiments, the DS 452-2 includes at least one antenna operably connected to the transceiver 432-2 and/or at least one optional network port operably connected to the transceiver 432-2.

In the embodiment depicted in FIG. 4, the HE 454-1 includes a transceiver 432-3 and a controller 434-3 operably connected to the transceiver 432-3, which includes a TPM 470-3 and a TLS unit 472-3 operably connected to the TPM 470-3. In the embodiment depicted in FIG. 4, the TPM 470-3 includes a secure storage unit (SSU) 476-3 that is configured to store an identify certificate 478-3. The TLS unit 472-3 includes an RPC proxy 474-3 configured to interact with the TPM 470-3 to, based on the identify certificate 478-3 stored in the TPM 470-3, establish a TLS connection to another network device. Although the HE 454-1 is shown in FIG. 4 as not including an antenna and/or network port, in some embodiments, the He 454-1 includes at least one antenna operably connected to the transceiver 432-3 and/or at least one optional network port operably connected to the transceiver 432-3.

In the embodiment depicted in FIG. 4, the HE 454-2 includes a transceiver 432-4 and a controller 434-4 operably connected to the transceiver 432-4, which includes a TPM 470-4 and a TLS unit 472-4 operably connected to the TPM 470-4. In the embodiment depicted in FIG. 4, the TPM 470-4 includes a secure storage unit (SSU) 476-4 that is configured to store an identify certificate 478-4. The TLS unit 472-4 includes an RPC proxy 474-4 configured to interact with the TPM 470-4 to, based on the identify certificate 478-4 stored in the TPM 470-4, establish a TLS connection to another network device. Although the HE 454-2 is shown in FIG. 4 as not including an antenna and/or network port, in some embodiments, the He 454-2 includes at least one antenna operably connected to the transceiver 432-4 and/or at least one optional network port operably connected to the transceiver 432-4.

In the embodiment depicted in FIG. 4, the AS 456-1 includes a transceiver 432-5 and a controller 434-5 operably connected to the transceiver 432-5, which includes a TPM 470-5 and a TLS unit 472-5 operably connected to the TPM 470-5. In the embodiment depicted in FIG. 4, the TPM 470-5 includes a secure storage unit (SSU) 476-5 that is configured to store an identify certificate 478-5. The TLS unit 472-5 includes an RPC proxy 474-5 configured to interact with the TPM 470-5 to, based on the identify certificate 478-5 stored in the TPM 470-5, establish a TLS connection to another network device. Although the AS 456-1 is shown in FIG. 4 as not including an antenna and/or network port, in some embodiments, the AS 456-1 includes at least one antenna operably connected to the transceiver 432-5 and/or at least one optional network port operably connected to the transceiver 432-5.

In the embodiment depicted in FIG. 4, the AS 456-2 includes a transceiver 432-6 and a controller 434-6 operably connected to the transceiver 432-6, which includes a TPM 470-6 and a TLS unit 472-6 operably connected to the TPM 470-6. In the embodiment depicted in FIG. 4, the TPM 470-6 includes a secure storage unit (SSU) 476-6 that is configured to store an identify certificate 478-6. The TLS unit 472-6 includes an RPC proxy 474-6 configured to interact with the TPM 470-6 to, based on the identify certificate 478-6 stored in the TPM 470-6, establish a TLS connection to another network device. Although the AS 456-2 is shown in FIG. 4 as not including an antenna and/or network port, in some embodiments, the AS 456-2 includes at least one antenna operably connected to the transceiver 432-6 and/or at least one optional network port operably connected to the transceiver 432-6.

In the embodiment depicted in FIG. 4, the wireless AP 460-1 includes a transceiver 432-7 and a controller 434-7 operably connected to the transceiver 432-7, which includes a TPM 470-7 and a TLS unit 472-7 operably connected to the TPM 470-7. In the embodiment depicted in FIG. 4, the TPM 470-7 includes a secure storage unit (SSU) 476-7 that is configured to store an identify certificate 478-7. The TLS unit 472-7 includes an RPC proxy 474-7 configured to interact with the TPM 470-7 to, based on the identify certificate 478-7 stored in the TPM 470-7, establish a TLS connection to another network device. Although the wireless AP 460-1 is shown in FIG. 4 as not including an antenna and/or network port, in some embodiments, the wireless AP 460-1 includes at least one antenna operably connected to the transceiver 432-7 and/or at least one optional network port operably connected to the transceiver 432-7.

In the embodiment depicted in FIG. 4, the wireless AP 460-2 includes a transceiver 432-8 and a controller 434-8 operably connected to the transceiver 432-8, which includes a TPM 470-8 and a TLS unit 472-8 operably connected to the TPM 470-8. In the embodiment depicted in FIG. 4, the TPM 470-8 includes a secure storage unit (SSU) 476-8 that is configured to store an identify certificate 478-8. The TLS unit 472-8 includes an RPC proxy 474-8 configured to interact with the TPM 470-8 to, based on the identify certificate 478-8 stored in the TPM 470-8, establish a TLS connection to another network device. Although the wireless AP 460-2 is shown in FIG. 4 as not including an antenna and/or network port, in some embodiments, the wireless AP 460-2 includes at least one antenna operably connected to the transceiver 432-8 and/or at least one optional network port operably connected to the transceiver 432-8.

In the embodiment depicted in FIG. 4, the wireless AP 460-3 includes a transceiver 432-9 and a controller 434-9 operably connected to the transceiver 432-9, which includes a TPM 470-9 and a TLS unit 472-9 operably connected to the TPM 470-9. In the embodiment depicted in FIG. 4, the TPM 470-9 includes a secure storage unit (SSU) 476-9 that is configured to store an identify certificate 478-9. The TLS unit 472-9 includes an RPC proxy 474-9 configured to interact with the TPM 470-9 to, based on the identify certificate 478-9 stored in the TPM 470-9, establish a TLS connection to another network device. Although the wireless AP 460-3 is shown in FIG. 4 as not including an antenna and/or network port, in some embodiments, the wireless AP 460-3 includes at least one antenna operably connected to the transceiver 432-9 and/or at least one optional network port operably connected to the transceiver 432-9.

In the embodiment depicted in FIG. 4, the wireless AP 460-4 includes a transceiver 432-10 and a controller 434-10 operably connected to the transceiver 432-10, which includes a TPM 470-10 and a TLS unit 472-10 operably connected to the TPM 470-10. In the embodiment depicted in FIG. 4, the TPM 470-10 includes a secure storage unit (SSU) 476-10 that is configured to store an identify certificate 478-10. The TLS unit 472-10 includes an RPC proxy 474-10 configured to interact with the TPM 470-10 to, based on the identify certificate 478-10 stored in the TPM 470-10, establish a TLS connection to another network device. Although the wireless AP 460-4 is shown in FIG. 4 as not including an antenna and/or network port, in some embodiments, the wireless AP 460-4 includes at least one antenna operably connected to the transceiver 432-10 and/or at least one optional network port operably connected to the transceiver 432-10.

In the embodiment depicted in FIG. 4, the wireless sensor 462 includes a transceiver 432-11 and a controller 434-11 operably connected to the transceiver 432-11, which includes a TPM 470-11 and a TLS unit 472-11 operably connected to the TPM 470-11. In the embodiment depicted in FIG. 4, the TPM 470-11 includes a secure storage unit (SSU) 476-11 that is configured to store an identify certificate 478-11. The TLS unit 472-11 includes an RPC proxy 474-11 configured to interact with the TPM 470-11 to, based on the identify certificate 478-11 stored in the TPM 470-11, establish a TLS connection to another network device. Although the wireless sensor 462 1 is shown in FIG. 4 as not including an antenna and/or network port, in some embodiments, the wireless sensor 462 includes at least one antenna operably connected to the transceiver 432-11 and/or at least one optional network port operably connected to the transceiver 432-11.

An example mutual authentication operation of the network 450 depicted in FIG. 4 is described with reference to FIGS. 5-8. In this example operation, the DSs 452-1, 452-2, the HEs 454-1, 454-2, the ASs 456-1, 456-2, the wireless APs 460-1, 460-2, 460-3, 460-4, and the wireless sensor 462 stores the identity certificates 478-1, 478-2, 478-3, 478-4, 478-5, 478-6, 478-7, 478-8, 478-9, 478-10, 478-11 in the TPMs 470-1, 470-2, 470-3, 470-4, 470-5, 470-6, 470-7, 470-8, 470-9, 470-10, 470-11, respectively. Within the TLS units 472-1, 472-2, 472-3, 472-4, 472-5, 472-6, 472-7, 472-8, 472-9, 472-10, 472-11 of the DSs 452-1, 452-2, the HEs 454-1, 454-2, the ASs 456-1, 456-2, the wireless APs 460-1, 460-2, 460-3, 460-4, and the wireless sensor 462, the RPC proxies 474-1, 474-2, 474-3, 474-4, 474-5, 474-6, 474-7, 474-8, 474-9, 474-10, 474-11, which are user space processes, interact with the corresponding TPMs 470-1, 470-2, 470-3, 470-4, 470-5, 470-6, 470-7, 470-8, 470-9, 470-10, 470-11, respectively, to gain access to the identity certificates 478-1, 478-2, 478-3, 478-4, 478-5, 478-6, 478-7, 478-8, 478-9, 478-10, 478-11, respectively. Once an RPC proxy 474-1, 474-2, 474-3, 474-4, 474-5, 474-6, 474-7, 474-8, 474-9, 474-10, or 474-11 starts up, the RPC proxy establishes a TLS connection with its peer RPC proxy in a particular sequence based on the network topology of the network 450, which may be provided by the cloud server 102 (e.g., the network management module 110). Using the RPC proxies 474-1, 474-2, 474-3, 474-4, 474-5, 474-6, 474-7, 474-8, 474-9, 474-10, 474-11, TLS connections between the DSs 452-1, 452-2, the HEs 454-1, 454-2, the ASs 456-1, 456-2, the wireless APs 460-1, 460-2, 460-3, 460-4, and the wireless sensor 462 are sequentially established to perform mutual authentication between the DSs 452-1, 452-2, the HEs 454-1, 454-2, the ASs 456-1, 456-2, the wireless APs 460-1, 460-2, 460-3, 460-4, and the wireless sensor 462 based on the identity certificates 478-1, 478-2, 478-3, 478-4, 478-5, 478-6, 478-7, 478-8, 478-9, 478-10, 478-11, respectively. For example, mutual authentication is first performed between the DSs 452-1, 452-2 of the network 450 and the HEs 454-1, 454-2 of the network 450, respectively. Subsequently, mutual authentication is performed between the DSs 452-1, 452-2 and the ASs 456-1, 456-2 of the network 450, respectively. Then, mutual authentication is performed between the ASs 456-1, 456-2 and the wireless APs 460-1, 460-2, 460-3, 460-4 of the network 450, respectively. Lastly, mutual authentication is performed between the wireless AP 460-4 and the wireless sensor 462. Prior to this example operation, the DSs 452-1, 452-2 are connected to the network 480 (e.g., the Internet), for example, through a router at the customer site 114. When any network element fails to authenticate its directly connected partner via the mutual TLS based authentication, the network element may take appropriate actions, including but not limited to, shutting down the link to the failed element and generating an alert notification to the cloud server 102 (e.g., the network management module 110). The cloud server 102 (e.g., the network management module 110) can keep a record of authentication failures and issue appropriate corrective actions and work orders.

Figure 5:
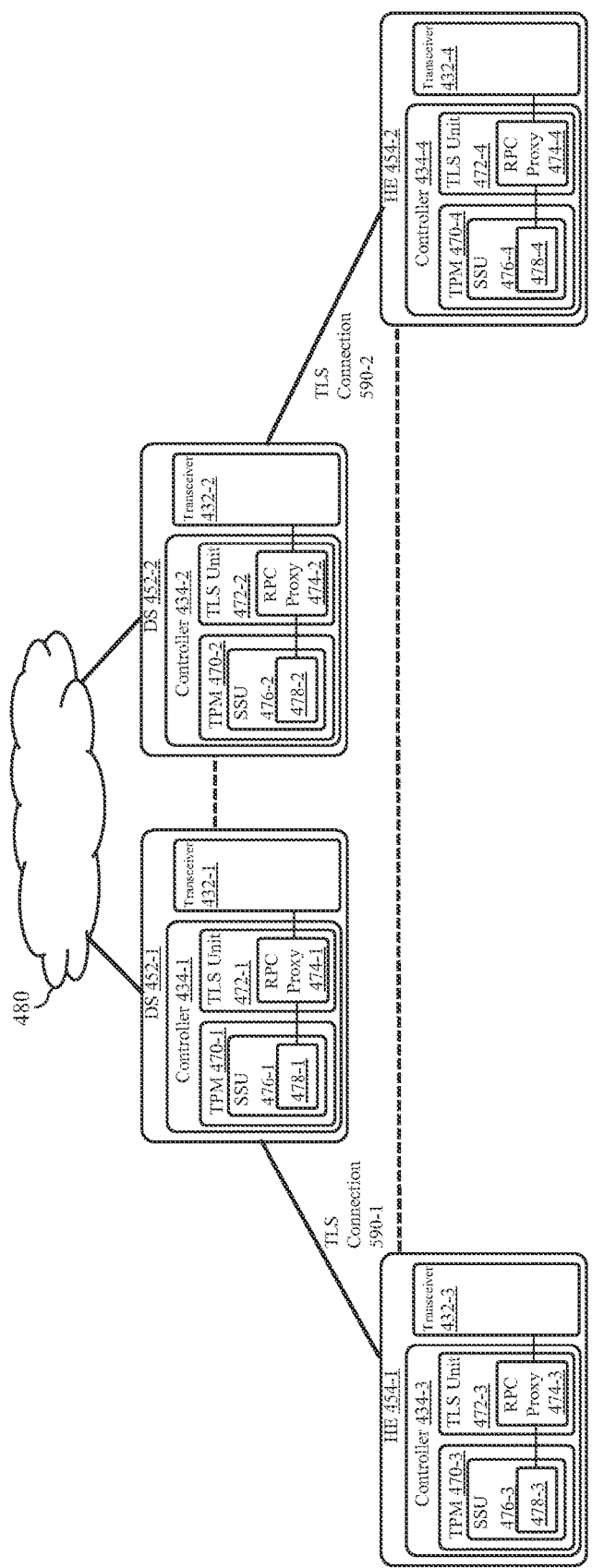
FIGS. 5-8 depict results of an example mutual authentication operation of the network depicted in FIG. 4.

The DSs 452-1, 452-2 authenticate any downstream HEs before accepting any traffic from the HEs. FIG. 5 depicts a result of a first step of the example authentication operation. In this first step, each of the DSs 452-1, 452-2 attempts or initiates a TLS connection (e.g., a Remote Procedure Call (RPC) connection, such as, a Google RPC (gRPC) connection) to a corresponding HE 454-1 or 454-2, for example, based on topology information that each of the DSs 452-1, 452-2 learnt from the cloud server 102 (e.g., the network management module 110) depicted in FIG. 1. The DSs 452-1, 452-2 and the HE 454-1, 454-2 store the identity certificates 478-1, 478-2, 478-3, 478-4 in the TPMs 470-1, 470-2, 470-3, 470-4, respectively. Within the TLS units 472-1, 472-2, 472-3, 472-4 of the DSs 452-1, 452-2 and the HE 454-1, 454-2, the RPC proxies 474-1, 474-2, 474-3, 474-4, which are user space processes, interact with the corresponding TPMs 470-1, 470-2, 470-3, 470-4, respectively, to gain access to the identity certificates 478-1, 478-2, 478-3, 478-4, respectively. Once an RPC proxy 474-1, 474-2, 474-3, or 474-4 starts up, the RPC proxy establishes a TLS connection with its peer RPC proxy. For example, the RPC proxy 474-1 establishes a TLS connection 590-1 with the RPC proxy 474-3, while the RPC proxy 474-2 establishes a TLS connection 590-2 with the RPC proxy 474-4. During the TLS connection establishment phase, both the server (DS) and the client (HE) present their identity certificates 478-1, 478-2, 478-3, 478-4 and a corresponding issuing chain. On successful validation of the peer certificate by each side, the TLS connection 590-1 or 590-2 is established. When a failed validation of the certificate occurs, a TLS connection is not established, and the rogue peer is unable to send any packet to the corresponding DS. In some embodiments, mutual authentication between the HEs is performed.

Figure 6:
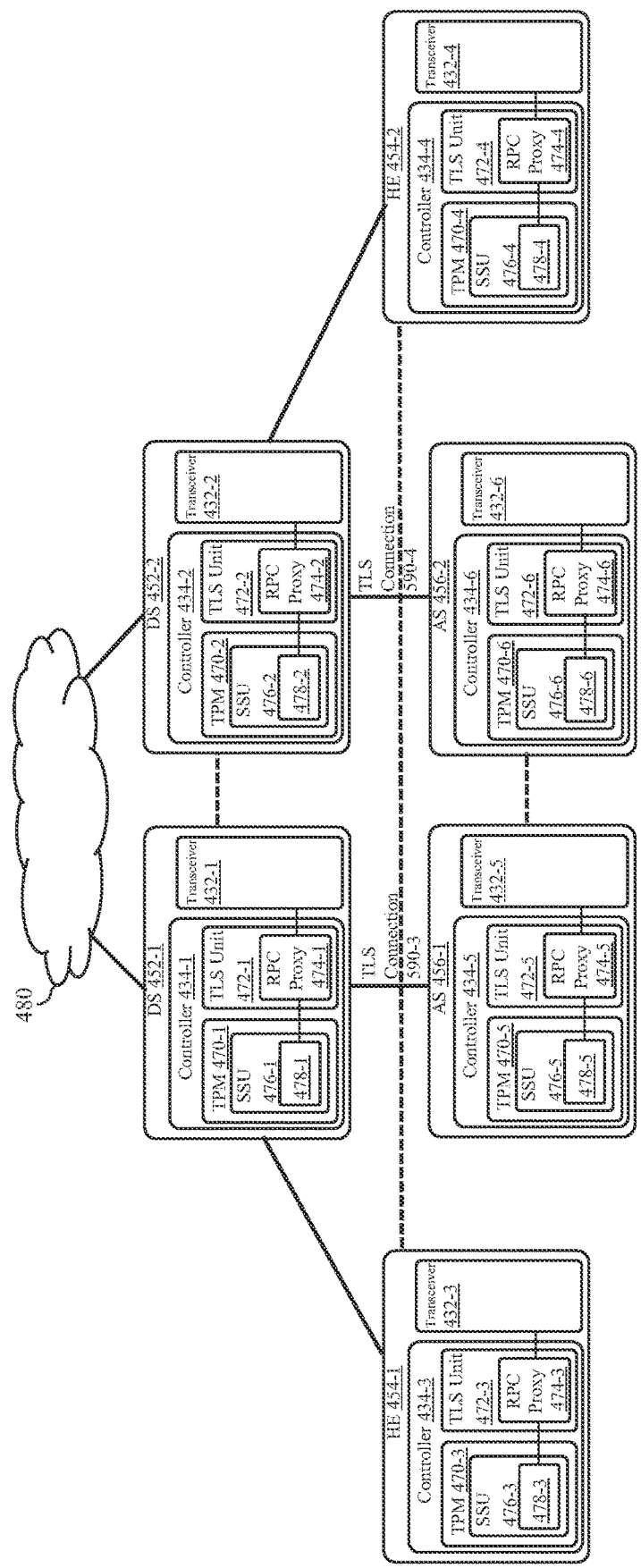

The DSs 452-1, 452-2 authenticate any downstream ASs before accepting any traffic from the ASs. FIG. 6 depicts a result of a second step of the example authentication operation. In this second step, each of the DSs 452-1, 452-2 attempts or initiates a TLS connection (e.g., an RPC connection, such as, a gRPC connection) to a corresponding ASs 456-1 or 456-2, for example, based on topology information that each of the DSs 452-1, 452-2 learnt from the cloud server 102 (e.g., the network management module 110) depicted in FIG. 1. The DSs 452-1, 452-2 and the ASs 456-1, 456-2 store the identity certificates 478-1, 478-2, 478-5, 478-46 in the TPMs 470-1, 470-2, 470-5, 470-6, respectively. Within the TLS units 472-1, 472-2, 472-5, 472-6 of the DSs 452-1, 452-2 and the ASs 456-1, 456-2, the RPC proxies 474-1, 474-2, 474-5, 474-6, which are user space processes, interact with the corresponding TPMs 470-1, 470-2, 470-5, 470-6, respectively, to gain access to the identity certificates 478-1, 478-2, 478-5, 478-6, respectively. Once an RPC proxy 474-1, 474-2, 474-5, or 474-6 starts up, the RPC proxy establishes a TLS connection with its peer RPC proxy. For example, the RPC proxy 474-1 establishes a TLS connection 590-3 with the RPC proxy 474-5, while the RPC proxy 474-2 establishes a TLS connection 590-4 with the RPC proxy 474-6. During the TLS connection establishment phase, both the server (DS) and the client (AS) present their identity certificates 478-1, 478-2, 478-5, 478-6 and a corresponding issuing chain. On successful validation of the peer certificate by each side, the TLS connection 590-3 or 590-4 is established. When a failed validation of the certificate occurs, a TLS connection is not established, and the rogue peer is unable to send any packet to the corresponding DS. In some embodiments, mutual authentication between the ASs is performed. In some embodiments, mutual authentication between the DSs and the ASs is performed prior to or in the same time as mutual authentication between the DSs and the HEs is performed.

Figure 7:
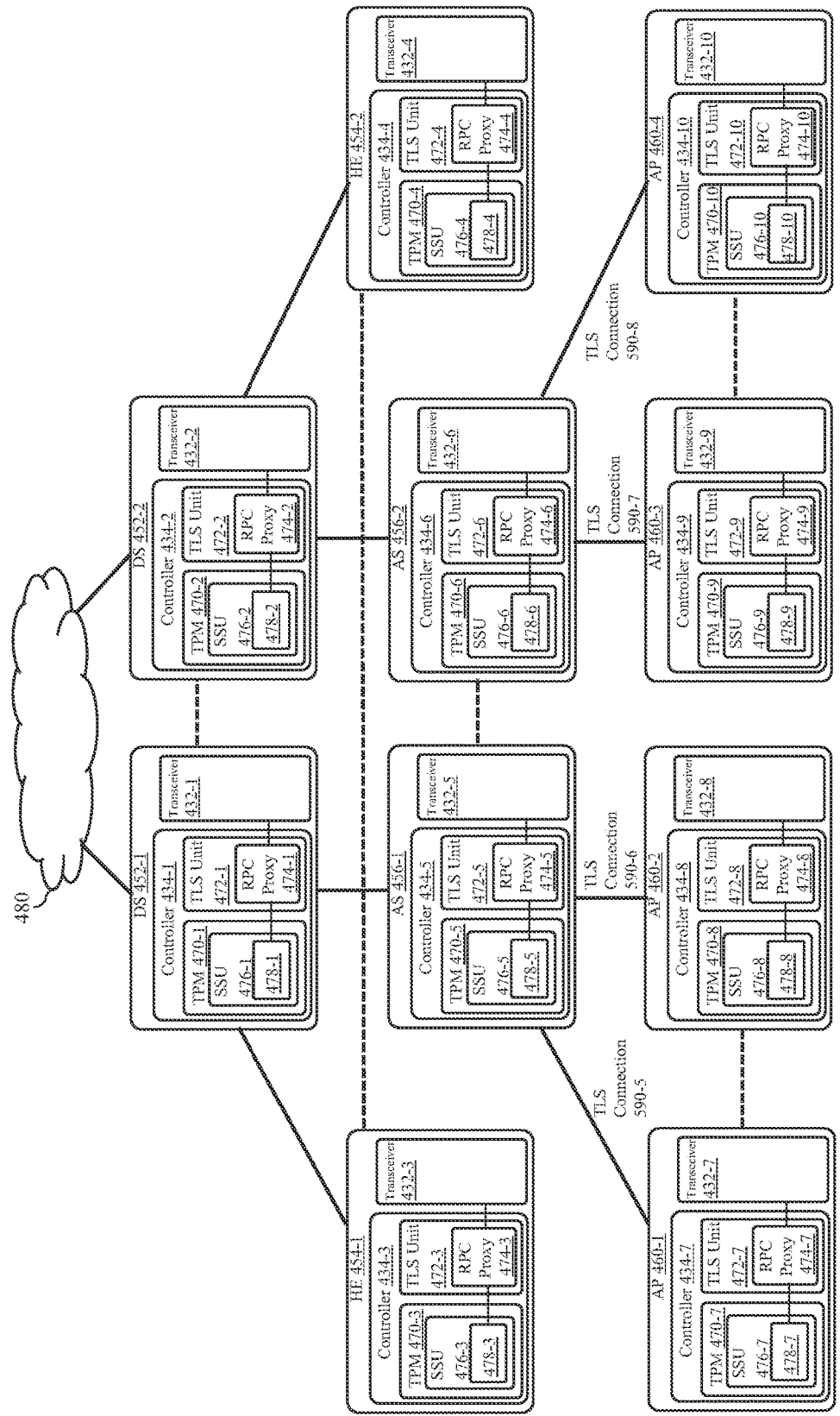

The ASs 456-1, 456-2 authenticate any peer AS and downstream wireless APs 460-1, 460-2, 460-3, 460-4 using the same mechanism as defined above before accepting any traffic from wireless APs. FIG. 7 depicts a result of a third step of the example authentication operation. In this third step, each of the ASs 456-1, 456-2 attempts or initiates a TLS connection (e.g., an RPC connection, such as, a gRPC connection) to a corresponding wireless AP 460-1, 460-2, 460-3, or 460-4. The DSs 452-1, 452-2 and the wireless APs 460-1, 460-2, 460-3, 460-4 store the identity certificates 478-5, 478-6, 478-7, 478-8, 478-9, 478-10 in the TPMs 470-5, 470-6, 470-7, 470-8, 470-9, 470-10, respectively. Within the TLS units 472-5, 472-6, 472-7, 472-8, 472-9, 472-10 of the ASs 456-1, 456-2 and the wireless APs 460-1, 460-2, 460-3, 460-4, the RPC proxies 474-5, 474-6, 474-7, 474-8, 474-9, 474-10, which are user space processes, interact with the corresponding TPMs 470-5, 470-6, 470-7, 470-8, 470-9, 470-10, respectively, to gain access to the identity certificates 478-5, 478-6, 478-7, 478-8, 478-9, 478-10, respectively. Once an RPC proxy 474-5, 474-6, 474-7, 474-8, 474-9, or 474-10 starts up, the RPC proxy establishes a TLS connection with its peer RPC proxy. For example, the RPC proxy 474-5 establishes a TLS connection 590-5 with the RPC proxy 474-7 and a TLS connection 590-6 with the RPC proxy 474-8, while the RPC proxy 474-6 establishes a TLS connection 590-7 with the RPC proxy 474-9 and a TLS connection 590-8 with the RPC proxy 474-10. During the TLS connection establishment phase, both the server (AS) and the client (AP) present their identity certificates 478-5, 478-6, 478-7, 478-8, 478-9, 478-10 and a corresponding issuing chain. On successful validation of the peer certificate by each side, the TLS connection 590-5, 590-6, 590-7, or 590-8 is established. When a failed validation of the certificate occurs, a TLS connection is not established, and the rogue peer is unable to send any packet to the corresponding AS. In some embodiments, mutual authentication between the wireless APs is performed.

Figure 8:
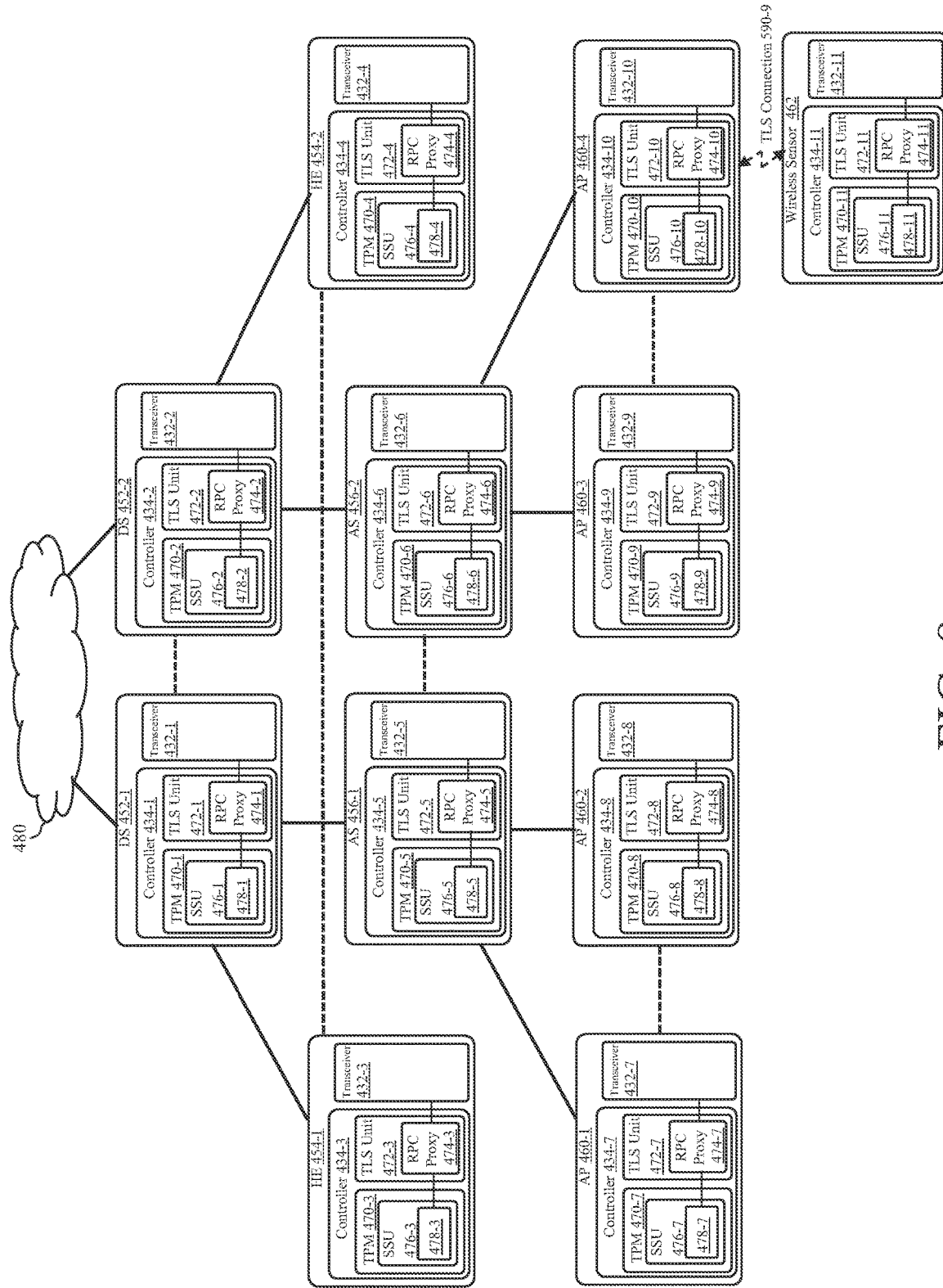

The wireless APs 460-1, 460-2, 460-3, 460-4 authenticate wireless sensors (e.g., the wireless sensor 462) using the same mechanism as defined above before accepting any traffic from wireless sensors. FIG. 8 depicts a result of a fourth step of the example authentication operation. In this fourth step, the wireless AP 460-4 attempts or initiates a TLS connection (e.g., an RPC connection, for example, a gRPC connection) to the wireless sensor 462. The wireless AP 460-4 and the wireless sensor 462 store the identity certificates 478-10, 478-11 in the TPMs 470-10, 470-11, respectively. Within the TLS units 472-10, 472-11 of the wireless AP 460-4 and the wireless sensor 462, the RPC proxies 474-10, 474-11, which are user space processes, interact with the corresponding TPMs 470-10, 470-11, respectively, to gain access to the identity certificates 478-10, 478-11, respectively. Once an RPC proxy 474-10 or 474-11 starts up, the RPC proxy establishes a TLS connection 590-9 with its peer RPC proxy. During the TLS connection establishment phase, both the server (AP) and the client (sensor) present their identity certificates 478-10, 478-11 and a corresponding issuing chain. On successful validation of the peer certificate by each side, the TLS connection 590-9 is established. When a failed validation of the certificate occurs, a TLS connection is not established, and the rogue peer is unable to send any packet to the corresponding wireless AP.

Figure 9:
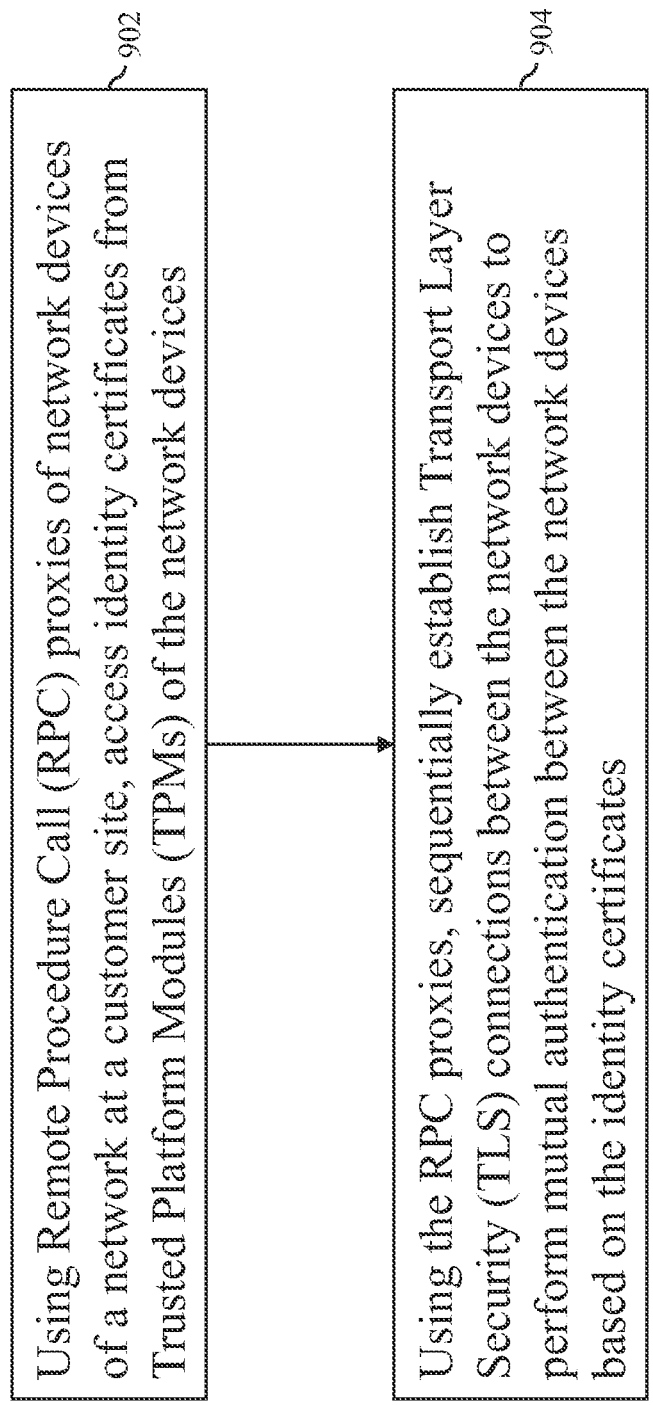
FIG. 9 is a process flow diagram of a method for network device authentication in accordance to an embodiment of the invention.

FIG. 9 is a process flow diagram of a method for network device authentication in accordance to an embodiment of the invention. According to the method, at block 902, using RPC proxies of network devices of a network at a customer site, identity certificates from TPMs of the network devices are accessed. At block 904, using the RPC proxies, TLS connections between the network devices are sequentially established to perform mutual authentication between the network devices based on the identity certificates. In some embodiments, the TLS connections include RPC connections. In some embodiments, the identity certificates are validated among the network devices. In some embodiments, the network includes at least one DS, at least one AS, and at least one wireless AP, and a first TLS connection between the at least one DS and the at least one AS is established, and after the first TLS connection is established, a second TLS connection between the at least one AS and the at least one wireless AP is established. In some embodiments, the network further includes at least one wireless sensor, and after the second TLS connection is established, a third TLS connection is established between the at least one wireless AP and the at least one wireless sensor. In some embodiments, the network further includes at least one HE, and after the first TLS connection is established, a third TLS connection is established between the at least one DS and the at least one HE. In some embodiments, the identity certificates are stored in secure storage units of the TPMs. The network devices may be similar to, the same as, or a component of the network devices 104-1, . . . , 104-N depicted in FIG. 1, the network device 204 depicted in FIG. 2, and/or the DSs 452-1, 452-2, the HEs 454-1, 454-2, the ASs 456-1, 456-2, the wireless APs 460-1, 460-2, 460-3, 460-4, and the wireless sensor 462 depicted in FIG. 4. The RPC proxies may be similar to, the same as, or a component of the RPC proxy 374 depicted in FIG. 3 and/or the RPC proxies 474-1, 474-2, 474-3, 474-4, 474-5, 474-6, 474-7, 474-8, 474-9, 474-10, 474-11 depicted in FIG. 4. The TPMs may be similar to, the same as, or a component of the TPM 370 depicted in FIG. 3 and/or the TPMs 470-1, 470-2, 470-3, 470-4, 470-5, 470-6, 470-7, 470-8, 470-9, 470-10, 470-11 depicted in FIG. 4. The identity certificates may be similar to, the same as, or a component of the identity certificate 378 depicted in FIG. 3 and/or the identity certificates 478-1, 478-2, 478-3, 478-4, 478-5, 478-6, 478-7, 478-8, 478-9, 478-10, 478-11 depicted in FIG. 4. The network may be similar to, the same as, or a component of the network 150 depicted in FIG. 1 and/or the network 450 depicted in FIG. 4. The customer site may be similar to, the same as, or a component of the customer site 114 depicted in FIG. 1.

Figure 10:
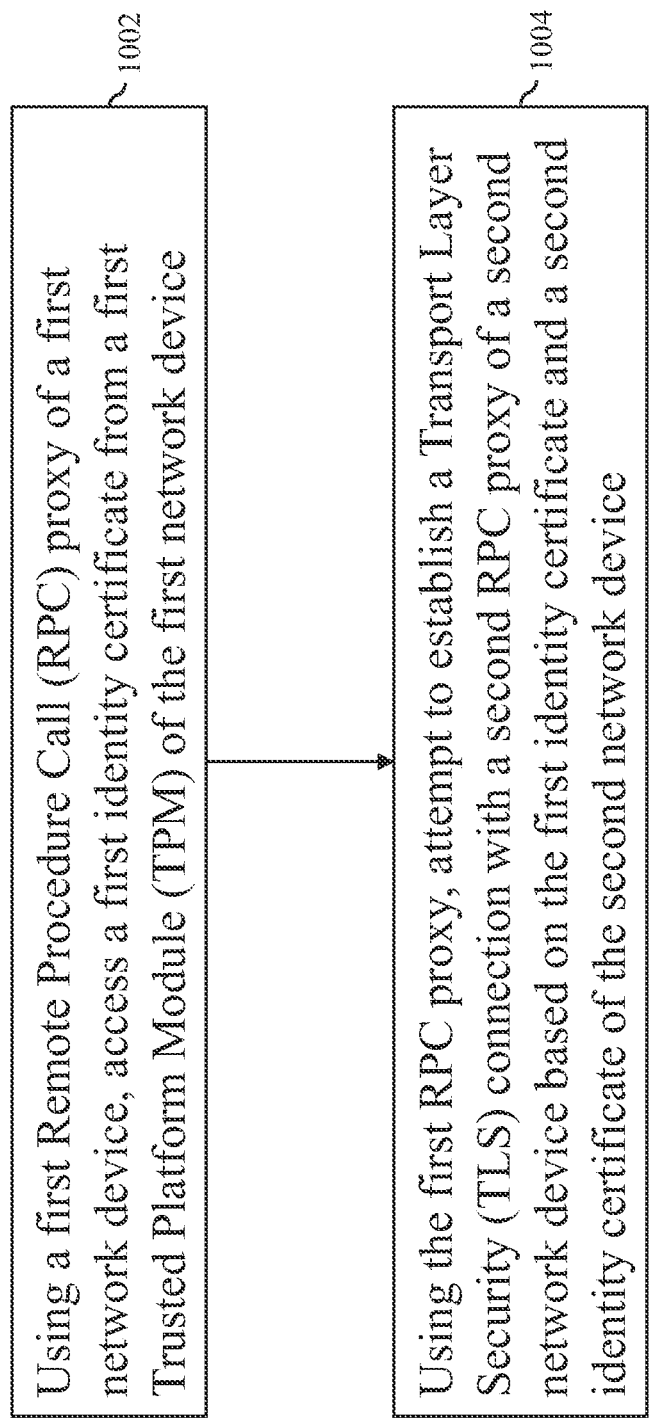
FIG. 10 is a process flow diagram of a method for network device authentication in accordance to an embodiment of the invention.

FIG. 10 is a process flow diagram of a method for network device authentication in accordance to an embodiment of the invention. According to the method, at block 1002, using a first RPC proxy of a first network device, a first identity certificate is accessed from a first TPM of the first network device. At block 1004, using the first RPC proxy, a TLS connection is attempted to establish with a second RPC proxy of a second network device based on the first identity certificate and a second identity certificate of the second network device. In some embodiments, using the second RPC proxy of the second network device, the second identity certificate is accessed from a second TPM of the second network device. In some embodiments, the TLS connection includes an RPC connection. In some embodiments, the first and second identity certificates are validated by the first and second network devices. In some embodiments, when the first and second identity certificates are successfully validated by the first and second network devices, the TLS connection is established between the first RPC proxy and the second RPC proxy. In some embodiments, when the first and second identity certificates are not successfully validated by the first and second network devices, the first and second network devices are prohibited from communicating with each other. In some embodiments, when the first and second identity certificates are not successfully validated by the first and second network devices, an alert notification to a cloud server is generated. In some embodiments, the first identity certificate is stored in a first secure storage unit of the first TPM, and the second identity certificate is stored in a second secure storage unit of the second TPM. The first and second network devices may be similar to, the same as, or a component of the network devices 104-1, . . . , 104-N depicted in FIG. 1, the network device 204 depicted in FIG. 2, and/or the DSs 452-1, 452-2, the HEs 454-1, 454-2, the ASs 456-1, 456-2, the wireless APs 460-1, 460-2, 460-3, 460-4, and the wireless sensor 462 depicted in FIG. 4. The RPC proxies may be similar to, the same as, or a component of the RPC proxy 374 depicted in FIG. 3 and/or the RPC proxies 474-1, 474-2, 474-3, 474-4, 474-5, 474-6, 474-7, 474-8, 474-9, 474-10, 474-11 depicted in FIG. 4. The TPMs may be similar to, the same as, or a component of the TPM 370 depicted in FIG. 3 and/or the TPMs 470-1, 470-2, 470-3, 470-4, 470-5, 470-6, 470-7, 470-8, 470-9, 470-10, 470-11 depicted in FIG. 4. The identity certificates may be similar to, the same as, or a component of the identity certificate 378 depicted in FIG. 3 and/or the identity certificates 478-1, 478-2, 478-3, 478-4, 478-5, 478-6, 478-7, 478-8, 478-9, 478-10, 478-11 depicted in FIG. 4. The network may be similar to, the same as, or a component of the network 150 depicted in FIG. 1 and/or the network 450 depicted in FIG. 4. The customer site may be similar to, the same as, or a component of the customer site 114 depicted in FIG. 1. The cloud server may be similar to, the same as, or a component of the cloud server 102 depicted in FIG. 1.

Figure 11:
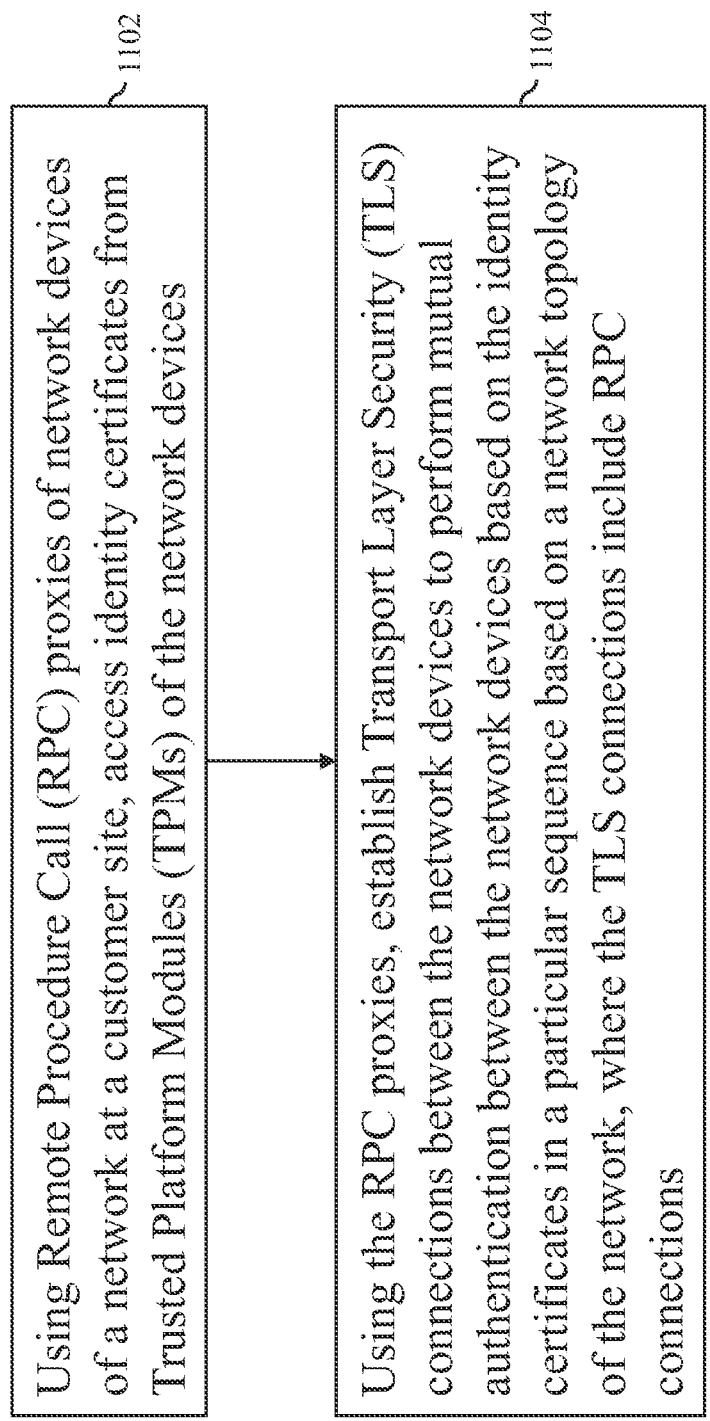
FIG. 11 is a process flow diagram of a method for network device authentication in accordance to an embodiment of the invention.

FIG. 11 is a process flow diagram of a method for network device authentication in accordance to an embodiment of the invention. According to the method, at block 1102, using RPC proxies of network devices of a network at a customer site, identity certificates are accessed from TPMs of the network devices. At block 1104, using the RPC proxies, TLS) connections are established between the network devices to perform mutual authentication between the network devices based on the identity certificates in a particular sequence based on a network topology of the network, where the TLS connections include RPC connections. In some embodiments, the identity certificates are validated among the network devices. In some embodiments, the network includes distribution switches (DSs), access switches (ASs), and wireless access points (APs), a first set of TLS connections are establishing between the DSs and the ASs, and after the first set of TLS connections are established, a second set of TLS connections are established between the ASs and the wireless APs. In some embodiments, the network further includes wireless sensors, and after the second set of TLS connections are established, a third set of TLS connections are established between the wireless APs and the wireless sensors. In some embodiments, the network further includes HEs, and after the first set of TLS connections are established, a third set of TLS connections are established between the DSs and the HEs. The network devices may be similar to, the same as, or a component of the network devices 104-1, . . . , 104-N depicted in FIG. 1, the network device 204 depicted in FIG. 2, and/or the DSs 452-1, 452-2, the HEs 454-1, 454-2, the ASs 456-1, 456-2, the wireless APs 460-1, 460-2, 460-3, 460-4, and the wireless sensor 462 depicted in FIG. 4. The RPC proxies may be similar to, the same as, or a component of the RPC proxy 374 depicted in FIG. 3 and/or the RPC proxies 474-1, 474-2, 474-3, 474-4, 474-5, 474-6, 474-7, 474-8, 474-9, 474-10, 474-11 depicted in FIG. 4. The TPMs may be similar to, the same as, or a component of the TPM 370 depicted in FIG. 3 and/or the TPMs 470-1, 470-2, 470-3, 470-4, 470-5, 470-6, 470-7, 470-8, 470-9, 470-10, 470-11 depicted in FIG. 4. The identity certificates may be similar to, the same as, or a component of the identity certificate 378 depicted in FIG. 3 and/or the identity certificates 478-1, 478-2, 478-3, 478-4, 478-5, 478-6, 478-7, 478-8, 478-9, 478-10, 478-11 depicted in FIG. 4. The network may be similar to, the same as, or a component of the network 150 depicted in FIG. 1 and/or the network 450 depicted in FIG. 4. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network device authentication, the method comprising:
   using a plurality of peer Remote Procedure Call (RPC) proxies of a plurality of peer network devices at a customer site, accessing a plurality of peer identity certificates from a plurality of Trusted Platform Modules (TPMs) of the peer network devices, wherein the peer network devices are deployed at the customer site; and
   using the peer RPC proxies of the peer network devices deployed at the customer site, sequentially establishing a plurality of Transport Layer Security (TLS) connections between the peer network devices to perform mutual authentication between the peer network devices based on the peer identity certificates at the customer site, wherein the peer network devices form a network at the customer site.

2. The method of claim 1, wherein the TLS connections comprise a plurality of RPC connections.

3. The method of claim 1, wherein using the peer RPC proxies of the peer network devices deployed at the customer site, sequentially establishing the TLS connections between the peer network devices comprises:
   validating the peer identity certificates among the peer network devices.

4. The method of claim 1, wherein the network comprises a first peer network device, a second peer network device, and a third peer network device, and wherein using the peer RPC proxies of the peer network devices deployed at the customer site, sequentially establishing the TLS connections between the peer network devices comprises:
   establishing a first TLS connection between the first peer network device and the second peer network device; and
   after the first TLS connection is established, establishing a second TLS connection between the second peer network device and the third peer network device.

5. The method of claim 4, wherein the network further comprises a fourth peer network device, and wherein using the peer RPC proxies of the peer network devices deployed at the customer site, sequentially establishing the TLS connections between the peer network devices further comprises:
   after the second TLS connection is established, establishing a third TLS connection between the third peer network device and the fourth peer network device.

6. The method of claim 4, wherein the network further comprises a fifth peer network device, and wherein using the peer RPC proxies of the peer network devices deployed at the customer site, sequentially establishing the TLS connections between the network devices further comprises:
   after the first TLS connection is established, establishing a third TLS connection between the first peer network device and the fifth peer network device.

7. The method of claim 1, further comprising:
   storing the peer identity certificates in a plurality of secure storage units of the TPMs.

8. A method for network device authentication, the method comprising:
   using a first peer Remote Procedure Call (RPC) proxy of a first peer network device deployed at a customer site, accessing a first peer identity certificate from a first Trusted Platform Module (TPM) of the first peer network device; and
   using the first peer RPC proxy, attempting to establish a Transport Layer Security (TLS) connection with a second peer RPC proxy of a second peer network device deployed at the customer site based on the first peer identity certificate and a second peer identity certificate of the second peer network device at the customer site, wherein the first and second peer network devices form a network at the customer site.

9. The method of claim 8, further comprising using the second peer RPC proxy of the second peer network device, accessing the second peer identity certificate from a second TPM of the second peer network device.

10. The method of claim 8, wherein the TLS connection comprises an RPC connection.

11. The method of claim 8, wherein using the first peer RPC proxy, attempting to establish the TLS connection with the second peer RPC proxy of the second peer network device based on the peer first identity certificate and the second peer identity certificate of the second peer network device comprises:
    validating the first and second peer identity certificates by the first and second peer network devices.

12. The method of claim 11, wherein when the first and second peer identity certificates are successfully validated by the first and second peer network devices, the TLS connection is established between the first peer RPC proxy and the second peer RPC proxy.

13. The method of claim 11, further comprising when the first and second peer identity certificates are not successfully validated by the first and second peer network devices, prohibiting the first and second peer network devices from communicating with each other.

14. The method of claim 11, further comprising when the first and second peer identity certificates are not successfully validated by the first and second peer network devices, generating an alert notification to a cloud server.

15. The method of claim 9, further comprising:
storing the first peer identity certificate in a first secure storage unit of the first TPM; and
storing the second peer identity certificate in a second secure storage unit of the second TPM.

16. A method for network device authentication, the method comprising:
using a plurality of peer Remote Procedure Call (RPC) proxies of a plurality of peer network devices at a customer site, accessing a plurality of peer identity certificates from a plurality of Trusted Platform Modules (TPMs) of the peer network devices, wherein the peer network devices are deployed at the customer site; and
using the peer RPC proxies of the peer network devices deployed at the customer site, establishing a plurality of Transport Layer Security (TLS) connections between the peer network devices to perform mutual authentication between the peer network devices based on the peer identity certificates in a particular sequence based on a network topology at the customer site, wherein the peer network devices form a network at the customer site, and wherein the TLS connections comprise a plurality of RPC connections.

17. The method of claim 16, wherein using the peer RPC proxies, sequentially establishing the TLS connections between the peer network devices comprises:

validating the peer identity certificates among the peer network devices.

18. The method of claim 17, wherein the network comprises a plurality of network devices of a first type, a plurality of network devices of a second type, and a plurality of network devices of a third type, and wherein using the peer RPC proxies of the peer network devices deployed at the customer site, establishing the TLS connections between the peer network devices comprises:
establishing a first set of TLS connections between the network devices of the first type and the network devices of the second type; and
after the first set of TLS connections are established, establishing a second set of TLS connections between the network devices of the second type and the network devices of the third type.

19. The method of claim 18, wherein the network further comprises a plurality of network devices of a fourth type, and wherein using the peer RPC proxies of the peer network devices deployed at the customer site, establishing the TLS connections between the peer network devices further comprises:
after the second set of TLS connections are established, establishing a third set of TLS connections between the network devices of the third type and the network devices of the fourth type.

20. The method of claim 18, wherein the network further comprises a plurality of network devices of a fifth type, and wherein using the peer RPC proxies of the peer network devices deployed at the customer site, establishing the TLS connections between the network devices further comprises:
after the first set of TLS connections are established, establishing a third set of TLS connections between the network devices of the first type and the network devices of the fifth type.

* * * * *